Sept. 22, 1970  P. E. JOUSSERANDOT  3,529,862
DEVICES FOR REDUCING THE AERODYNAMIC DRAG
OF AUTOMOTIVE VEHICLES
Filed Dec. 5, 1967
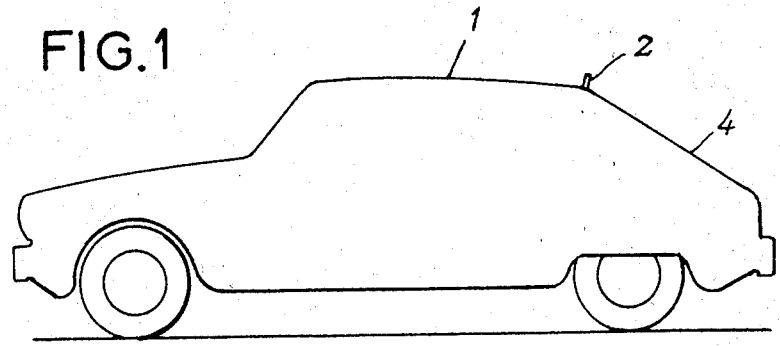
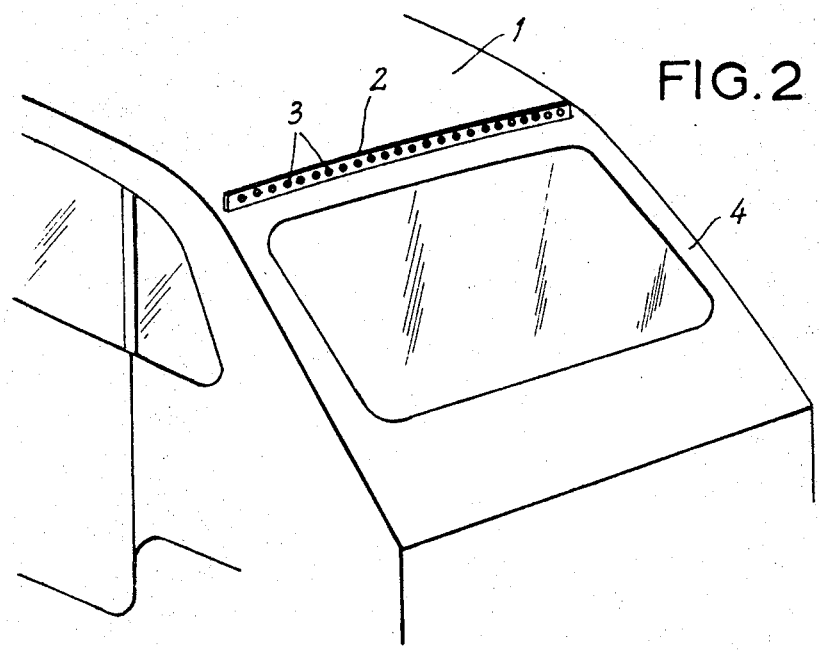
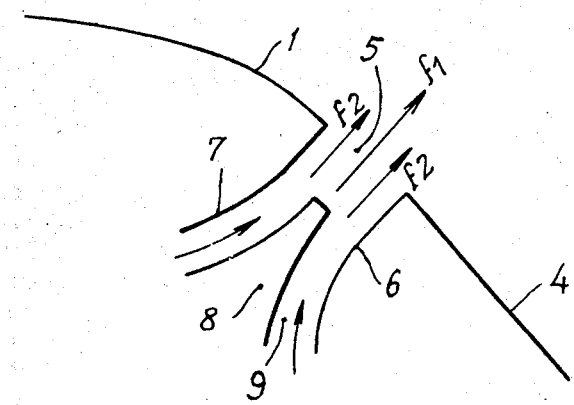
INVENTOR
PIERRE E. JOUSSERANDOT
By
ATTORNEYS

United States Patent Office 3,529,862
Patented Sept. 22, 1970

3,529,862
DEVICES FOR REDUCING THE AERODYNAMIC DRAG OF AUTOMOTIVE VEHICLES
Pierre E. Jousserandot, Billancourt, France, assignor to Regie Nationale des Usines Renault, Billancourt, France, and Automobiles Peugeot, Paris, France
Filed Dec. 5, 1967, Ser. No. 688,224
Claims priority, application France, Dec. 29, 1966, 89,393
Int. Cl. B62d 35/00
U.S. Cl. 296—1                                    1 Claim

ABSTRACT OF THE DISCLOSURE

This device comprises static and aerodynamic means associated with the vehicle body, at the rear end of the roof, and adapted to deflect the air flow away from the near surface of the vehicle to reduce its lift.

---

This invention relates to means for reducing the aerodynamic drag or resistance to motion of automotive vehicles.

Many tests carried out in wind tunnels for determining this aerodynamic drag and therefore the head resistance of automotive vehicles proved that certain body shapes generated a considerable drag ascribable more specifically to the drag induced by the lift.

It is the scope of the present invention to avoid this inconvenience by providing a device designed for reducing the resistance to motion of automotive vehicles, this device correcting the lift by deflecting the air flow away from the rear surfact of the body.

A first form of embodiment of this device is similar to the one well known in aircraft construction under the name of "spoiler," which is retracted under normal flying conditions and used temporarily for reducing the lift-drag ratio of the aircraft in order notably to shorten its landing run if the latter is otherwise deemed to be too long.

According to this invention and as contrasted to this known device the desired result is not to reduce but to increase the speed of an automotive vehicle, for a same power absorption, by reducing or eliminating the drag induced by the vehicle lift.

In this first form of embodiment the device according to this invention consists essentially of rigid strip extending substantially at right angles to the outer surface of the vehicle along the width thereof, in the vicinity of the vehicle portion having the maximum curvature and connecting the roof to the rear portion of the vehicle body. This strip is perforated in order to reduce its aerodynamic wake.

In a second form of embodiment the deflection of the air flow is obtained by using only aerodynamic means consisting of nozzle means adapted to cause a primary air stream to be ejected through a transverse slot located as in the preceding case at or in close vicinity to the curved joint between the roof and the rear wall of the vehicle body. This air stream is advantageously utilized for driving by Venturi or siphon effect a certain quantity of secondary air taken from the inner or passenger space of the vehicle body, thereby assisting in ventilating the aforesaid space.

This invention will now be described with reference to the attached drawing illustrating diagrammatically by way of example two typical forms of embodiment thereof. In the drawing:

FIG. 1 illustrates the outer contour of an automobile equipped with the strip constituting the first form of embodiment of the device of this invention;

FIG. 2 is a perspective view from the rear and from the near side of the same vehicle; and FIG. 3 illustrates in section, taken along the longitudinal center plane of the vehicle, the ejection slot constituting another form of embodiment of the device of this invention.

In FIGS. 1 and 2 the reference numeral 1 designates the top or roof surface of an automotive vehicle, 2 being a preferably metal strip formed with perforations 3 and secured by cementing, welding or any other suitable means to and in the vicinity of the rear wall 4 of the vehicle body, i.e. in the curved portion constituting the joint between this wall and the roof. This strip 2 extends throughout the width of the vehicle body so as to follow its transverse curvature and lies substantially in, or in the vicinity of, a plane intersecting the radius of greater curvature of said joint, so as to extend radially or at rght angles therefrom.

This perforated strip causes the aerodynamic air stream to be deflected from the rear surface of the vehicle body, and the perforation reduces the aerodynamic wake of the strip.

In another form of embodiment of the invention illustrated in FIG. 3 the air stream deflection is obtained by using purely aerodynamic means consisting of nozzle means adapted to eject a primary air stream through a transverse slot 5 located as in the first form of embodiment at or in the vicinity of the joint between the roof 1 and the rear wall 4 of the vehicle body. The edges 6 of the slit are folded at right angles to the body surface and extends inwards of the vehicle substantially throughout the width of the body, these edges 6 having divergent curved marginal wall portions 7. A nozzle member 8 extends substantially throughout the width of the body, at right angles to the plane of the figure. This nozzle member is disposed between the two divergent wall portions 7 and its lateral faces are parallel thereto, as shown; its function is to deliver an air jet under pressure in the direction of the arrow $f_1$. This primary air jet carries along by Venturi or siphon effect a certain quantity of secondary air taken from thhe inner space of the vehicle and flowing through the passages 9 formed between said nozzle member 8 and said wall portions 7, thus forming an air flow shown by the arrows $f_2$. The resultant air stream produced by the primary and secondary air streams or outputs directed substantially at right angles to the outer surface of the body causes the aerodynamic air stream produced along the outer surface of the body to be deflected away therefrom thus reducing the lift.

Of course, other forms of embodiment equivalent to those shown and described herein may be contemplated by those skilled in the art without departing from the

I claim:
1. A device for reducing the resistance to the motion of automotive vehicles having a body with a roof presenting a transversal curvature, comprising a rigid strip having perforations, said strip extending through the width of the vehicle and being strongly secured to said body at the trailing end of the roof in vicinity of the surface portion thereof which has the greater curvature of the body and connecting said roof to the rear portion of the body, said strip accommodating the transversal curvature of said vehicle and forming right angles to the outer surface of said body, and said perforations directing the air flow away from the entire rear surface of the vehicle.

References Cited

UNITED STATES PATENTS

| | | |
|---|---|---|
| 2,932,370 | 4/1960 | Kraus. |
| 3,348,873 | 10/1967 | Saunders. |
| 3,089,728 | 5/1963 | Shumaker _____ 296—91 |
| 3,427,067 | 2/1969 | Kish _____ 296—91 X |

FOREIGN PATENTS

| | | |
|---|---|---|
| 443,903 | 3/1936 | Great Britain. |
| 501,231 | 11/1954 | Italy. |

PHILIP GOODMAN, Primary Examiner.

U.S. Cl. XR.

296—91